United States Patent [19]

Kitamura

[11] Patent Number: 4,727,905

[45] Date of Patent: Mar. 1, 1988

[54] PNEUMATIC CONTROL DEVICE FOR CONTROLLING PNEUMATIC SYSTEM

[75] Inventor: Akihiko Kitamura, Aichi, Japan

[73] Assignee: Kojima Press Industry Co., Ltd., Aichi, Japan

[21] Appl. No.: 3,416

[22] Filed: Jan. 15, 1987

Related U.S. Application Data

[62] Division of Ser. No. 861,918, May 12, 1986, Pat. No. 4,688,602.

[30] Foreign Application Priority Data

May 14, 1985 [JP] Japan .................................. 60-70825
May 17, 1985 [JP] Japan .................................. 60-74031

[51] Int. Cl.⁴ ........................................... F16K 11/065
[52] U.S. Cl. ........................... 137/625.48; 137/625.25; 137/353
[58] Field of Search ........... 137/625.2, 625.48, 625.49, 137/625.5, 353, 625.25, 625.27

[56] References Cited

U.S. PATENT DOCUMENTS

| | | | |
|---|---|---|---|
| 47,072 | 3/1865 | Thorn | 137/625.2 |
| 2,792,019 | 5/1957 | Leisen | 137/625.48 X |
| 3,820,828 | 6/1974 | Fiddler | 137/625.48 X |
| 4,305,569 | 12/1981 | Raab et al. | 137/353 X |

*Primary Examiner*—A. Michael Chambers
*Assistant Examiner*—John C. Fox
*Attorney, Agent, or Firm*—Parkhurst & Oliff

[57] ABSTRACT

A pneumatic control device for controlling a pneumatic system operable in a plurality of modes, including: push levers corresponding to the operation modes and movable in a first direction to its operated position, the push levers being spaced from each other in a second direction perpendicular to the first direction; changeover switches operated by the push levers for selectively establishing the operation modes, each switch including an actuator member movable within the housing in the second direction between its first and second positions; and a plurality of plate cams superposed on each other and disposed so as to extend in the second direction, in operative association with the push levers so as to cause relative longitudinal movements of the cams upon movements of the push levers to the operated position, each cam engaging the operating portion of at least one of the switches, so that the operating portion of each switch engaging the cam is moved in the second direction together with the cam upon the movement of the cam, the relative longitudinal movements of the cams being determined so as to place the actuator members selectively in the first and second positions depending upon the operated push levers, thereby placing the pneumatic system in the operation modes selected by the operated push levers.

5 Claims, 14 Drawing Figures

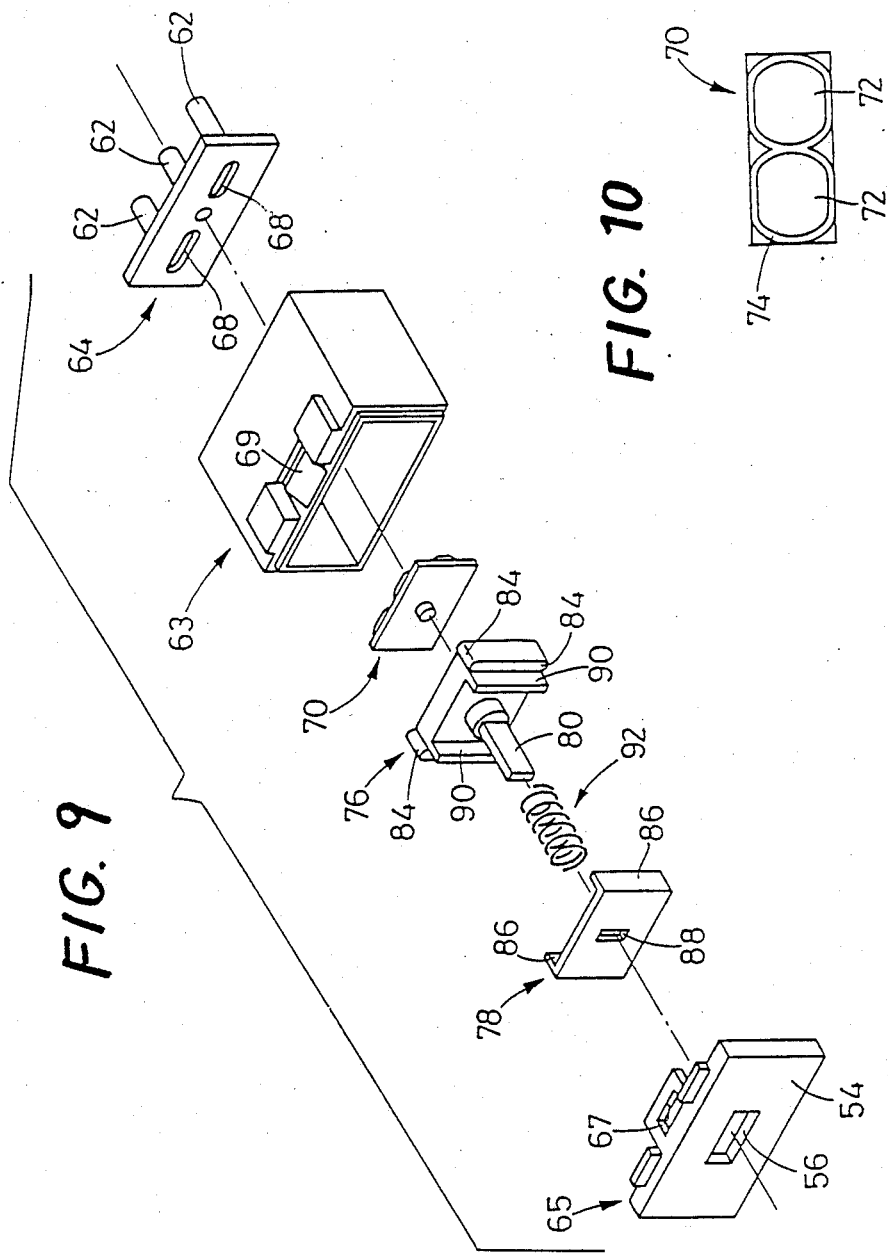

PNEUMATIC CONTROL DEVICE FOR CONTROLLING PNEUMATIC SYSTEM

This is a division of application Ser. No. 861,918 filed May 12, 1986, now U.S. Pat. No. 4,688,602.

BACKGROUND OF THE INVENTION

1. Field of the Art

The present invention relates in general to a pneumatic control device for controlling a pneumatic system such as a pneumatic circuit for operating an air-conditioning system for an automotive vehicle, and more particularly to such a pneumatic control device including a plurality of changeover switches which are controlled by selectively depressing a plurality of push levers, so as to place the pneumatic system selectively in a plurality of operation modes corresponding to the push levers. The invention is also concerned with the construction of the changeover switches.

2. Related Art Statement

In an air-conditioning or air-controlling system of an automotive vehicle, an air damper is generally disposed in an air passage for conditioning the air in the room of the vehicle. The damper is operable in different positions to place the air-conditioning system selectively in one of a plurality of operation modes. Recently, such a damper is operated by a pneumatically-operated member such a diaphragm which is operated by a vacuum air source easily available on the automotive vehicle. The use of a vacuum air source for operating the diaphragm leads to constructional simplification of the control device for controlling the air-conditioning system. Further, the vacuum-operated control device meets the recent taste of the vehicle operators. More specifically, changeover switches are connected between the vacuum source and the vacuum-operated diaphragm to control the fluid communication between the vacuum source and the diaphragm, while push levers corresponding to the operation modes of the air-conditioning system are provided to control the operations of the changeover switches, in order to place the air-conditioning system in the operation mode corresponding to the operated push lever.

For example, Japanese Utility Model Application laid open under Publication No. 50-33442, shows such a pneumatic control device which uses vacuum control switches of piston type wherein a piston is movable in a cylinder to control fluid communication between the vacuum source and a vacuum-operated actuator for controlling the air-conditioning system. An alternative control device is known according to Japanese Utility Model Application published for opposition purpose under Publication No. 56-4489. This latter control device uses changeover switches of micro-switch type which are operated by depression of their pushbuttons, to control air passages for the air-conditioning system.

In the former pneumatic control device using the piston type control switches, the piston connected to a push lever is biased by a spring in a direction that causes the piston to project out of the cylinder. When the operation mode of the air-conditioning system is changed, the push lever must be operated against a biasing force of the spring for the piston, as well as a biasing force of a return spring which is provided for returning the operated push lever to its non-operated position. Thus, the control device inevitably requires a relataively large force to operate the push lever.

In the latter pneumatic control device using the micro-switch type changeover switches, too, a biasing spring is disposed in each switch such that the biasing force increases the required operating force that must be applied to the corresponding push lever, as in the control device using the changeover switches of the piston type indicated above.

In the above latter control device, a plurality of plate cams are disposed in mutually spaced-apart relation to actuate the pushbuttons of the corresponding changeover switches. The push levers are held in their operated positions by corresponding lock plates. These plate cams and lock plates are biased by respective springs in the predetermined directions. To operate each changeover switch, the push lever must be moved against the biasing force of the corresponding plate cam and the biasing force of the corresponding lock plate. Thus, the use of these additional springs further increase the required force for moving the push levers to their operated position. Further, the spaced-apart arrangement of the plate cams and the lock plates results in increasing the overall size of the pneumatic control device. This is not desirable since the control device is generally installed on an isntrument panel of the vehicle, whose space for the control device is relatively limited.

SUMMARY OF THE PRESENT INVENTION

It is accordingly an object of the present invention to provide a simple and compact pneumatic control device for controlling a pneumatic system, which is easy to operate and requires reduced space for installation.

Another object of the present invention is to provide an improved changeover switch used in such a pneumatic control device.

According to the present invention, there is provided a pneumatic control device for controlling a pneumatic system which includes at least one vacuum source and at least one vacuum-operated member operable by said at least one vacuum source, the pneumatic system being selectively operable in a plurality of operation modes, comprising: (a) a plurality of push levers corresponding to the plurality of operation modes of the pneumatic system and movable in a first direction between a non-operated and an operated position thereof, the push levers being disposed in parallel to each other and spaced apart from each other in a second diredtion perpendicular to the first direction, each of the push levers having an actuator portion at one end thereof corresponding to the operated position thereof; (b) a plurality of changeover switches connected to the at least one vacuum source and the at least one vacuum-operated member to selectively establish the plurality of operation modes, each of the plurality of changeover switches including a housing having a front wall, and an actuator member having an operating portion which extends through the front wall, the actuator member being movable within the housing in the second direction between a first and a second position thereof, for permitting and inhibiting fluid communication between the at least one vacuum source and the at least one vacuum-operated member; and (c) a cam assembly consisting of a plurality of elongate plate cams superposed on each other. The cam assembly is disposed, so as to extend in the second direction, in operative association with the actuator portions of the push levers in such a manner as to cause relative longitudinal movements of the elongate plate cams in the second direction upon selective operation of the push levers and consequent movements thereof to the operated position. Each of the plate cams engages the operating portion of at least one of the plurality of changeover switches, such that the operating portion of each of the changeover switches engages only one of the plate cams so that the operating portion of each changeover switch engages the above-indicated only one plate cam is moved in the second direction together with this only one plate cam upon the longitudinal movement of the only one plate cam. The relative longitudinal movements of the plate cams imported to the operating portions of the actuator members through the respective plate cams are determined so that the actuator members of the changeover switches are placed selectively in the first and second positions depending upon the operated push levers, whereby the pneumatic system are placed selectively in the plurality of operation modes corresponding to the operated push levers.

In the pneumatic control device of the present invention contructed as described above, each changeover switch for controlling the fluid communication of the vacuum-operated member with the vacuum source is operated with its actuator member moved within the housing between its first and second positions in the second direction parallel to the front wall of the housing. In the instant control device, the actuator member whose operating portion engages one of the plate cams is not biased by any biasing means in the second direction. Thus, each changeover switch of the present control device is easily operable without an additional force applied to the corresponding push lever to overcome the biasing force of such biasing means as used in the changeover switch of the conventional device. In other words, the push levers corresponding to the operation modes of the pneumatic system may be depressed by the operator with a reduced operating force, and with an improved operating feel.

Upon depression of the appropriate push lever corresponding to the desired operation mode of the pneumatic system, the plate cams which are operatively associated with the actuator portions of the push levers are moved relative to each other in the second direction, whereby the operating portions of the changeover switches are moved in the same direction together with the plate cams, to place the changeover switches in the first or second position depending upon the depressed push lever. Since no biasing means are used for biasing the plate cams, the push levers may be easily operated without a force overcoming the biasing force of such biasing springs as used in the conventional device for biasing the plate cams.

A further advantage of the present pneumatic control device is derived from the unique arrangement of the cam assembly in which the plate cams are superposed on each other such that they are longitudinally movable relative to each other upon depression of the push levers. Namely, the plate cams do not require a large space as needed in the conventional device in which the plate cams are spaced from each other in a direction perpendicular to the longitudinal direction. Thus, the instant control device may be constructed compact as a whole. Further, there is no need to superpose the plate cams in the predetermined order, that is, the plate cams may be superposed on each other at random. Accordingly, the assembling procedure of the control device is simplified.

According to one feature of the invention, each of the plate cams has a plurality of first cutouts which are formed in spaced-apart relation with each other in the second direction. The first cutouts are engageable with the actuator portions of the push levers, respectively, upon the movements of the push levers to the operated position, whereby each plate cam is positioned in the second direction at predetermined positions corresponding to the plurality of push levers. Each plate cam further has at least one second cutout which engages the operating portion of the actuator member of one of the plurality of changeover switches such that the plate cam is immovable relative to the actuator member of the above-indicated one changeover switch in the second direction.

In one form of the above feature of the invention, the plurality of first cutouts are formed in one of transverse opposite ends of each elongate plate cam, so as to extend toward the other transverse end. Each of the first cutouts has a mouth portion open at the edge of the above-indicated one transverse end, and a positioning bottom portion having a shape identical with a shape of the actuator portion of the corresponding push lever. The mouth portion may have an inclined surface which terminates in the positioning bottom portion. The actuator portion of the push lever is slidable on the inclined surface when the push lever is moved to the operated position, whereby the corresponding plate cam is moved in the second direction.

In another form of the same feature of the invention, each plate cam further has at least one third cutout having a larger width than the second cutout. Each third cutout formed in one of the plate cams permiting movements therein of the operating portion of the changeover switch which engages corresponding one of the at least one second cutout formed in one of the other plate cams.

According to another feature of the invention, the housing of each changeover switch further has a rear wall, and each changeover switch further includes a wall member cooperating with the rear wall of the housing to define a double-walled structure. One of the wall member and the rear wall of the housing which forms an inner member of the double-walled structure has three mutually independent through-holes which are formed through the inner member. The three through-holes are spaced apart from each other in the second direction. In the meantime, the other of the wall member and the rear wall which forms an outer member of the double-walled structure has three ports which are spaced apart from each other. The three ports are connected to the three through-holes, respectively, and to the at least one vacuum source or the at least one vacuum-operated member. Each changeover switch further includes a valve member disposed in the housing and movable in said second direction between a first and a second position thereof with the actuator member of the corresponding changeover switch such that an outer surface of the valve member is fluid-tightly slidable on an inner surface of the inner member of the double-walled structure. The valve member has two mutually independent recesses in the outer surface thereof. When the valve member is placed in its first position, one of the two recesses communicates with two adjacent through-holes of the three through-holes to thereby connect the two adjacent through-holes while the other of the two recesses communicates with the remaining one of the three through-holes to thereby inhibit fluid communication of the remaining one through-hole with the two adjacent through-holes.

When the valve member is placed in its second position, the other recess communicates with the above-indicated remaining one through-hole and one of the above-indicated two adjacent through-holes that is the central through-hole, while the above-indicated one recess communicates with the other one of the two adjacent two through-holes. Thus, the central port is selectively brought into communication with one of the other two ports.

In the pneumatic control device incorporating the above feature, the mutually spaced apart three ports formed in the outer member of the double-walled structure are connected to the corresponding three through-holes which are formed in the inner member of the double-walled structure and which are open to the interior of the housing (more specifically, open to the recesses in the valve member in the housing). In this arrangement, the spacing of the three through-holes in the second direction may be made smaller than that of the three ports which are directly connected to the vacuum source or the vacuum-operated member. Therefore, the volume of each of the two recesses formed in the valve member adapted to effect selective fluid communication of the two adjacent through-holes, may be made accordingly small, whereby the sliding resistance of the valve member due to the vacuum pressure in the recesses may be reduced. Consequently, the actuator member operatively connected to the push lever through the cam assembly may be moved between its first and second positions with a comparatively reduced operating force applied to the push lever.

Further, the comparatively reduced spacing between the adjacent through-holes contributes to reduction in an operating stroke of the valve member in the second direction, whereby the size of the changeover switch may be accordingly reduced. In the conventional device wherein three ports are directly open in the interior of the cylinder, the actuator member in the form of a piston is required to have a comparatively large operating stroke sufficient to cover the open ends of the outer two ports which are spaced apart from each other by a comparatively large distance.

In one form of the above feature of the invention, the front wall of the housing has an elongate slot through which the operating portion of the actuator member extends. The elongate slot permits the operating portion to be moved in the second direction when the actuator member is moved between the first and second positions thereof. The actuator member holds or retains the valve member to move the valve member between the first and second positions thereof when the actuator member is moved between the first and second positions thereof, respectively. Each changeover switch further includes biasing means for biasing the valve member by a predetermined force to hold the valve member in pressed fluid-tight sliding contact with the inner surface of the inner member of the double-walled structure.

In another form of the above feature of the invention, the housing of each changeover switch is a generally enclosed structure which consists of a front member including the front wall, and a rear member including the rear wall. One of the front and rear members has at least one hole, while the other of the front and rear members includes at least one tab which detachably engages the at least one hole, respectively, whereby the front and rear members cooperate to form the generally enclosed structure.

In a further form of the above feature, the double-walled structure of each changeover switch has at least one passage which connects corresponding at least one of the three through-holes to the corresponding at least one of the three ports, respectively. The at least one passage may consist of two grooves which are formed in the outer member of the double-walled structure. These two grooves cooperate with the surface of the inner member of the double-walled structure to define two passages connecting the outer two through-holes of the three through-holes to the corresponding two outer ports, respectively.

In accordance with a further form of the above feature of the invention, the inner and outer members of the double-walled structure are secured by ultrasonic welding to each other, whereby the three through-holes are fluid-tightly connected to the three ports, respectively.

According to a still further form of the same feature of the invention, each changeover switch further has a sealing member interposed between the rear wall of the housing and the wall member. The sealing member fluid-tightly connects the three through-holes to the three ports, respectively.

According to yet another form of the same feature of the invention, each changeover switch further includes a sliding member disposed between the actuator member and the front wall of the housing. The sliding member is movable together with the actuator and valve members in the second direction and slidable on an inner surface of the front wall in the second direction. The sliding member is movable relative to the actuator member in the first direction. Each changeover switch further includes biasing means disposed between the sliding member and the actuator member, to bias the valve member by a predetermined force to hold the valve member in pressed fluid-tight sliding contact with the inner surface of the inner member of the double-walled structure.

According to another aspect of the present invention, there is provided a changeover switch for controlling a pneumatic system, comprising: a housing including a front wall having an elongate slot extending in one direction, and a rear wall parallel to the front wall, a wall member cooperating with the rear wall of the housing to define a double-walled structure, one of the wall member and the rear wall of the housing which forms an inner member of the double-walled structure having three mutually independent through-holes which are formed through the inner member, the three through-holes being spaced apart from each other in the above-indicated one direction, the other of the wall member and the rear wall which forms an outer member of the double-walled structure having three ports which are connected to the three through-holes, respectively; a valve member disposed in the housing and movable in the second direction between a first and a second position thereof such that an outer surface of the valve member is fluid-tightly slidable on an inner surface of the inner member of the double-walled structure, the valve member having two mutually independent recesses in the outer surface thereof, one of the two recesses communicating with two adjacent through-holes of the three through-holes to thereby connect the two adjacent through-holes, while the other of the two recesses communicating with the remaining one of the three through-holes to thereby inhibit fluid communication of the remaining one through-hole with the two adjacent through-holes, when the valve member is placed in the first position, the other recess communicating with the above-indicated remaining one through-hole and one of the two adjacent through-holes which is the central through-hole, while the above-indicated one recess communicating with the other one of the two adjacent two through-holes, when the valve member is placed in the second position, whereby the central port is brought into communication with one of the other two ports, selectively; an actuator member disposed in the housing movably in the above-indicated one direction, the actuator member having an operating portion which extends from one of opposite surfaces thereof through the elongate slot formed in the front wall of the housing, such that the elongate slot permits the operating portion to be moved in the above-indicated one direction when the actuator member is moved between the first and second positions thereof, the actuator member holding at the other of the opposite surfaces thereof the valve member to move the valve member between the first and second positions thereof when the actuator member is moved in the first and second positions thereof, respectively; and biasing means for biasing the valve member by a predetermined force to hold the valve member in pressed fluid-tight sliding contact with the inner surface of the inner member of the double-walled structure.

BRIEF DESCRIPTION OF THE DRAWINGS

The above and other objects, features and advantages of the present invention will be better understood by reading the following detailed description of a preferred embodiment of the invention, when considered in connection with the accompanying drawings, in which:

FIG. 9 is an exploded perspective view of the changeover switch of FIGS. 7 and 8;

FIG. 10 is a rear view of a valve member used in the changeover switch;

DETAILED DESCRIPTION OF THE PREFERRED EMBODIMENT

To further clarify the concept of the present invention, the preferred embodiment of the invention in the form of a pneumatic control device for an air-conditioning system will be described in detail referring to the accompanying drawings. The air-conditioning system to which the present embodiment of the invention is connected to selectively operable in one of five modes of operations: "DEF", "HEAT", "BI-LEVEL", "VENT" and "AUTO" modes.

Figure 1:
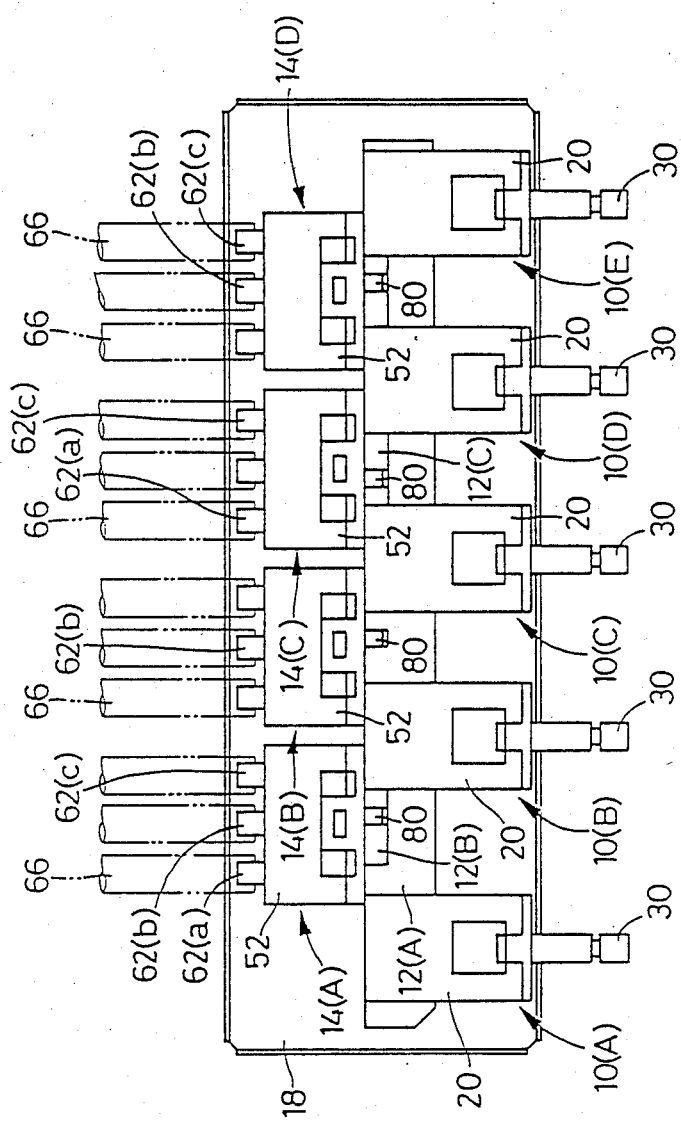
FIG. 1 is a plan view of one embodiment of a pneumatic control device of the invention, with its upper mounting plate removed.
Figure 2:
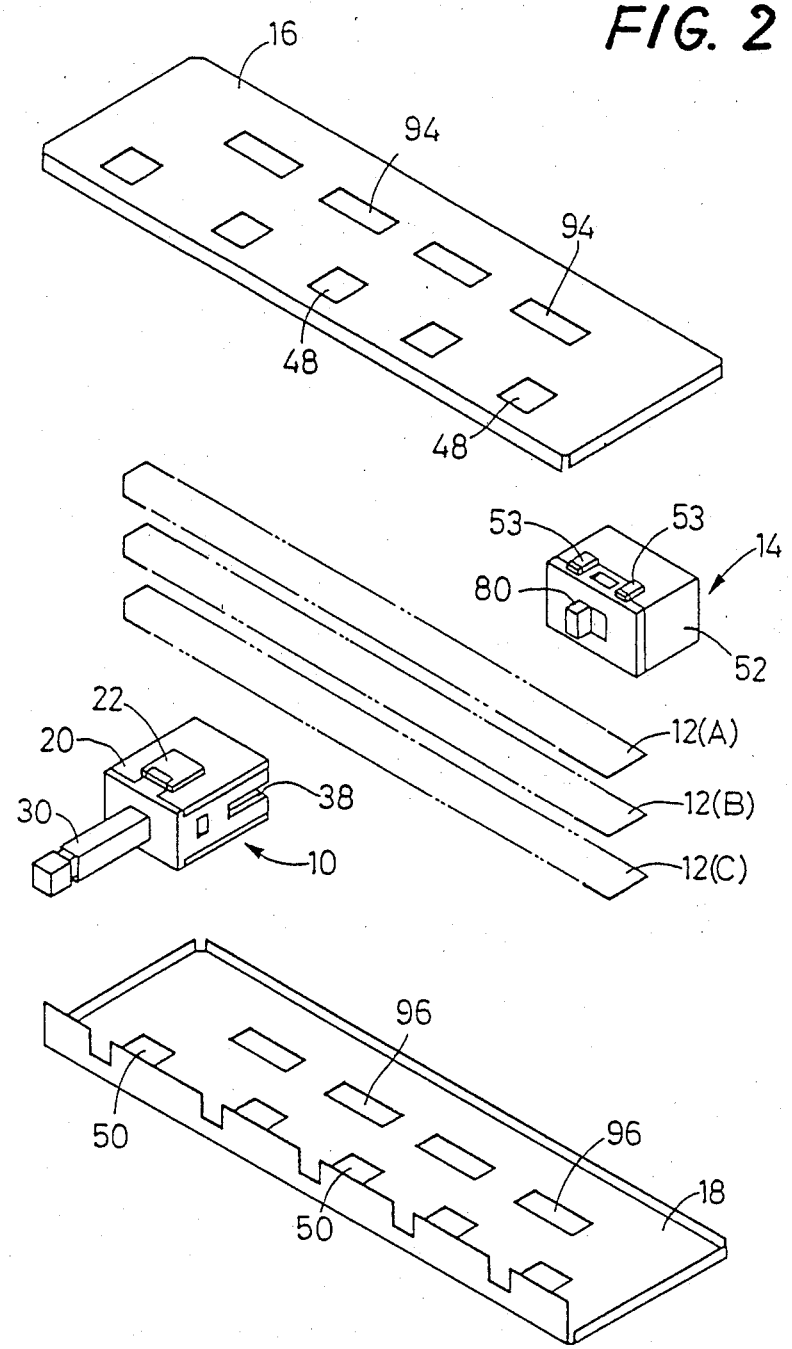
FIG. 2 is an illustrative perspective view of the control device of FIG. 1.

Referring first to the plan view of FIG. 1 and the perspective view of FIG. 2, the pneumatic control device includes five push-lever units 10, and four change-over switches 14 which are operatively connected to the push-lever units 10. An assembly of the push-lever units 10 and the changeover switches 14 is supported by and housed in a frame structure consisting of an upper mounting plate 26 and a lower mounting plate 18, as described later in detail.

Figure 3:
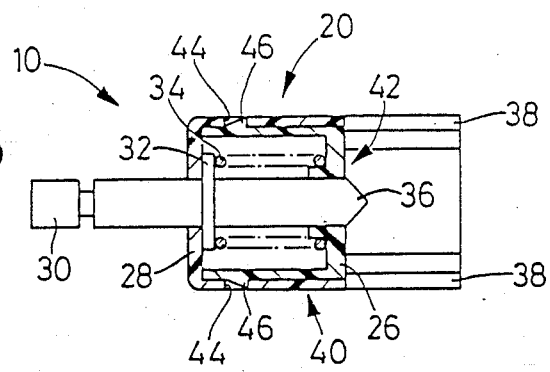
FIG. 3 is a cross sectional plan view of one of a plurality of push-lever units incorporated in the control device of FIG. 1.
Figure 4:
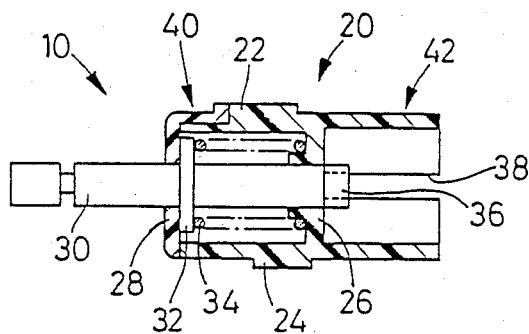
FIG. 4 is a side elevational view in cross section of the push-lever unit of FIG. 3.

As indicated in FIGS. 3 and 4, each of the push-lever units 10 has a housing 20 of a generally box construction which is open at its rear end (the right-hand side end as viewed in the figures). The housing 20 has an upper and a lower rectangular ear 22, 24, which are formed on the outer surfaces of the upper and lower walls, respectively, as indicated in FIG. 4. The interior of the housing 20 is divided by a partition wall 26 which is located in the middle of its length as seen from the closed front end to the open rear end. The push-lever unit 10 includes a push lever 30 which extends through a front wall 28 and the partition wall 26, such that the push lever 30 is slidably movable in its longitudinal direction, i.e., perpendicular to the walls 26, 28. The push lever 30 has a rectangular shape in transverse cross section as shown in FIG. 2.

The push lever 30 of each push-lever unit 10 has a flange 32 which is formed so as to be located between the front and partition walls 28, 26. The push lever 30 is biased by a compression coil spring 34 disposed between the flange 32 and the partition wall 26, so that the flange 32 is held in pressed abutting contact with the inner surface of the front wall 28 as indicated in FIGS. 3 and 4. Thus, the push lever 30 is normally placed in its front position of FIGS. 2 and 3. In this position, a rear end portion 36 of the push lever 30 projects a predetermined suitable distance from the partition wall 26. The rear end portion 36 has a triangular shape in the plan view of FIG. 3. More specifically, the rear end portion 36 assumes the shape (in longitudinal cross section of the push lever 30) of an equilateral triangle having an apex of about 90 degrees. This rear end portion 36 serves as an actuator portion of the push lever 30 to operate a cam assembly 12 which consists of three plate cams 12(A), 12(B) and 12(C), as described later in greater detail. As shown in FIG. 1, the front operating ends of the push levers 30 are located on a straight line which is parallel to and in front of the front surface of the control device.

The opposed right and left side walls of the housing 20 of the push-lever unit 10 have a pair of slots 38 which are formed parallel to the push lever 30, from the open end of the housing 20 to the partition wall 26, as depicted in FIGS. 3 and 4. The slots 38 have the same height as the push lever 30. The three plate cams 12(A)–(C) superposed on each other are received in the slots 38 in the five push-lever units 10, as described later.

As shown in FIGS. 3 and 4, the housing 20 consists of an outer member 40 including the front wall 28, and an inner member 42 including the partition wall 26. The outer member 40 has engagement holes 44, while the inner member 42 has engagement tabs 46. These outer and inner members 40, 42 are detachably assembled into the housing 20, with the engagement tabs 46 fitted in the engagement holes 44.

Figure 5:
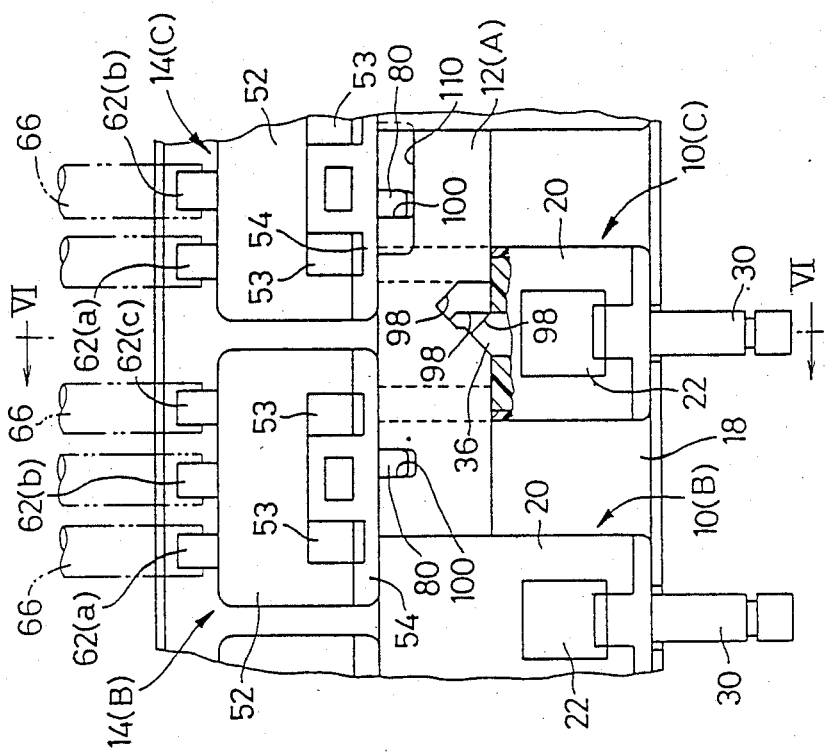
FIG. 5 is a fragmentary view in enlargement of the control device of FIG. 1.
Figure 6:
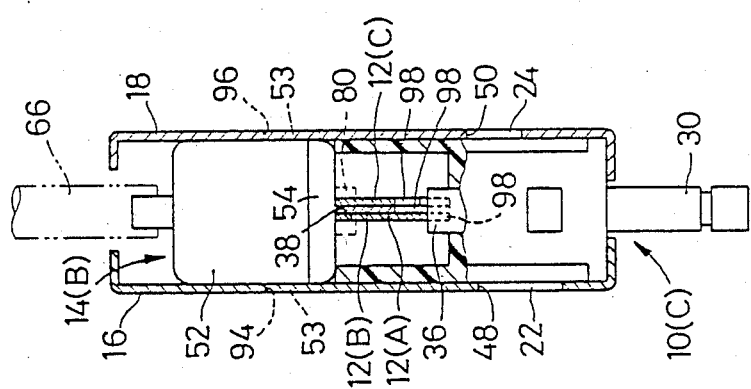
FIG. 6 is a partially cutaway, side elevational view in cross section taken along line VI—VI of FIG. 5.

As most clearly shown in FIG. 2, the upper mounting plate 16 have an array of five rectangular cutouts 48 corresponding to the five push-lever units 10(A) through 10(E) each of which is constructed as described above. Similarly, the lower mounting plate 18 has an array of five rectangular cutouts 50 corresponding to the push-lever units 10. The cutouts 46, 50 are arranged in a spaced-apart relation in the longitudinal direction of the pneumatic control device (from right to left in FIG. 1). The five push-lever units 10 are sandwiched between the upper and lower mounting plates 16, 18, such that the rectangular upper and lower ears 22, 24 on the housings 20 of the units 10 are accommodated in the corresponding cutouts 46, 50, as indicated in FIGS. 5 and 6. The cutouts 46, 50 are so positioned that the front end portion of each push lever 30 projects from the front surfaces of the mounting plates 16, 18. As most clearly shown in FIG. 1, the projecting front ends of the push lever 30 are normally positioned in a straight row, and are equally spaced from each other by a suitable distance in the longitudinal direction of the control device. Each push lever 30 is provided at its front end with an operating knob (not shown) at which the push lever is finger-pressed.

Figure 7:
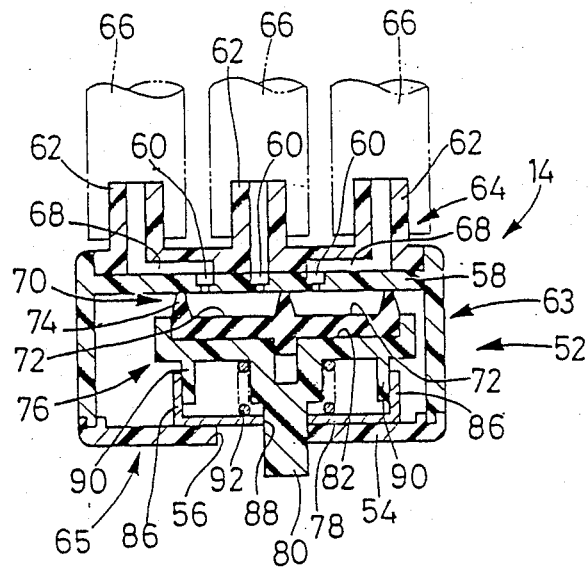
FIG. 7 is a cross sectional plan view of one of a plurality of changeover switches incorporated in the control device of FIG. 1.
Figure 8:
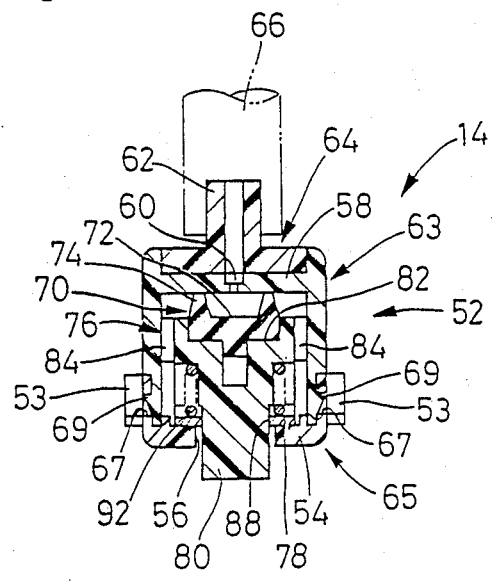
FIG. 8 is a side elevational view in cross section of the changeover switch of FIG. 7.

In the meantime, each of the four changeover switches 14(A) through 14(D) is constructed as shown in the plan and elevational views of FIGS. 7 and 8, and in the perspective view of FIG. 9. Described in greater detail, each changeover switch 14 has a housing generally indicated at 52 in FIGS. 7 and 8. The housing 52 has a generally box structure with a large dimension in the longitudinal direction of the control device. This dimension (horizontal dimension in FIG. 7) is hereinafter referred to as "longitudinal direction" of the housing 52. Each of the upper and lower walls of the housing 52 has a pair of spaced-apart lugs 53, 53 (FIG. 5), and a front wall 54 has an elongate slot 56 which is formed in the longitudinal direction of the housing 52. The housing 52 further has three through-holes 60 formed through a rear wall 58. The through-holes 60 communicate with the inside and outside of the housing 52, and are equally spaced apart from each other in the longitudinal direction of the housing 52, as most clearly shown in FIG. 7. The outer surface of the rear wall 58 is covered by a port member 64 which has three ports 62 formed therein. The port member 64 is secured at its flat inner surface to the outer surface of the rear wall 58 by ultrasonic welding.

The housing 52 of each changeover switch 14 consists of a box-like rear member 63 including the rear wall 58 and the lower wall, and a front member 65 including the front wall 54 which closes the opening of the rear member 63. The front member has holes 67 while the rear member has tabs 69. The front and rear members 65, 63 are fixed together into the housing 52, with the tabs 69 engaging the holes 67, as most clearly shown in FIG. 8.

The three ports 62 formed in the port member 64 are spaced from each other in the longitudinal direction of the housing 52, so that three holes 66 are connected to the respective ports 62. The central through-hole 60 is directly connected to the corresponding central port 62. However, the right and left through-holes 60 on the opposite sides of the central through-hole 60 are connected to the corresponding right and left ports 62 through respective grooves 68 formed in the inner flat surface of the port member 64. More specifically, with the port member 64 fluid-tightly secured to the rear wall 58, the right groove 68 communicates with the corresponding right through-hole 60 and port 62, while the left groove 68 communicates with the corresponding left through-hole 60 and port 62. Thus, the three ports 62 communicate with the inside space of the housing 52, through the respective three through-holes 60, as most clearly indicated in FIG. 7. In each changeover switch 14 of the present embodiment having the two groove 68, therefore, the three ports 62 which are spaced apart from each other by a relatively large distance, are open in the inner surface of the rear wall 58, at the corresponding three positions which are spaced apart from each other by a relatively small distance.

The housing 52 accommodates a valve member 70 in the form of a generally elongate rectangular plate made of an elastic material such as rubber. This valve member 70 is disposed parallel to the rear wall 58 so that the valve member 70 is slidable on the inner surface of the rear wall 58, while maintaining fluid-tightness therebetween. The surface of the valve member 70 which contacts the rear wall 58 has two mutually independent recesses 72 which are formed adjacent to each other in the longitudinal direction of the housing 52, as shown in FIG. 10. The recesses 72 are defined by ridges 74 formed so as to surround the corresponding two areas of the surface of the rectangular plate 70. The valve member 70 is moved in the longitudinal direction, between its first and second positions as described later in detail. When the valve member 70 is placed in its first position of FIG. 7, for example, the left and central through-holes 60 are held in communication with the left recess 72, while the right through-hole 60 is in communication with the right recess 72. Consequently, the left and central through-holes 60 communicate with each other through the left recess 72, but are separated from the right through-hole 60, while the valve member 70 is placed in the first position. Similarly, when the valve member 70 is in the second position, the right and central through-holes 60 are held in communication with each other through the right recess 72. It will be understood that the volume of each recess 72 is selected to be as small as possible, but sufficient for achieving the above-indicated function of connecting the adjacent two through-holes 60, and therefore the adjacent two ports 62.

The housing 52 further accommodates an actuator member 76 made of a synthetic resin and a metallic sliding member 78, which are both disposed movably in the longitudinal direction. The actuator member 76 has an operating portion 80 in the form of a bar having a rectangular transverse cross section. The actuator member 76 is disposed in the housing 52 such that the operating portion 80 extends through the elongate slot 56 formed in the front wall 54, and projects a suitable distance from the front surface of the front wall 54. Further, the actuator member 80 has a recess 82 in the surface opposite to the surface from which the operating portion 80 extends. The recess 82 is shaped so as to meet the profile of the mating surface of the valve member 70, in order to hold the valve member 70 so that the valve member 70 is movable together with the actuator member 76 in the longitudinal direction parallel to the rear wall 58. The actuator member 76 further has a pair of extensions 84 at each longitudinal end. The extensions 84 extend outwardly toward the upper and lower walls of the housing 52. The actuator member 76 is moved in the housing 52, with these four extensions 86 slidably contacting the inner surfaces of the upper and lower walls of the housing 52.

The sliding member 78 is a generally planar member having a pair of opposed bent portions 86 which extend from the opposite longitudinal ends toward the actuator member 76. The planar portion has an aperture 88 in its central part. The bent portions 86 engages a corresponding pair of projections 90 which extend from the actuator member 76 toward the sliding member 78. The operating portion 80 of the actuator member 76 extends through the aperture 88. A compression coil spring 92 is wound around a part of the operating portion 80 between the sliding and actuator members 76, 78, whereby the sliding member 78 is held in pressed sliding contact with the inner surface of the front wall 54, while the actuator member 76 is biased toward the rear wall 58. In this arrangement, the ridges 74 of the valve member 70 are held in pressed fluid-tight contact with the inner surface of the rear wall 58, with a suitable pressure. In this condition, the assembly of the sliding member 78, actuator member 76 and the valve member 70 is slidably movable within the housing 50 in its longitudinal direction between the first position of FIG. 7 and the second position.

More specifically, the central port 62 is brought into communication with the left or right port 62 when the valve member 70 is moved to the first or second position by moving the actuator member 76 with its operating portion 80. The two adjacent ports 62 communicating with each other through one of the recesses 72 are completely disconnected from the remaining third port 62. Since the changeover switch 14 used in the present embodiment does not employ biasing means for biasing the actuator member 76 in the operating direction, the actuator member 76 may be easily moved with a comparatively small operating force.

Further, the changeover switch 14 is advantageous in that the pitch of the through-holes 60 open to the inside space of the housing 52 is smaller that that of the ports 62. This means an accordingly small volume of each recess 72 of the valve member 70 which communicates with the two adjacent through-holes 60. Therefore, the resistance to the sliding movement of the valve member 70 due to the vacuum pressures in the recesses 72 is reduced, whereby the required operating force applied to the operating portion 80 is accordingly reduced. Furthermore, the reduced pitch of the through-holes 60 results in reduction in the operating stroke of the actuator member 76 (valve member 70), making it possible to minimize the overall size of the changeover switch 14.

As indicated in FIGS. 5 and 6, each of the changeover switches 14(A) through 14(D) is positioned between the corresponding adjacent two push-lever units 10 as seen in the longitudinal direction of the control device, such that the front wall 54 abuts on the rear end faces of the push-lever units 10, so as to close the rear end of the slots 38. The changeover switches 14 are supported by the upper and lower mounting plates 16, 18, with the lugs 53 fitted in correesponding rectangular cutouts 94, 96 formed in the mounting plates 16, 18.

Figure 11:
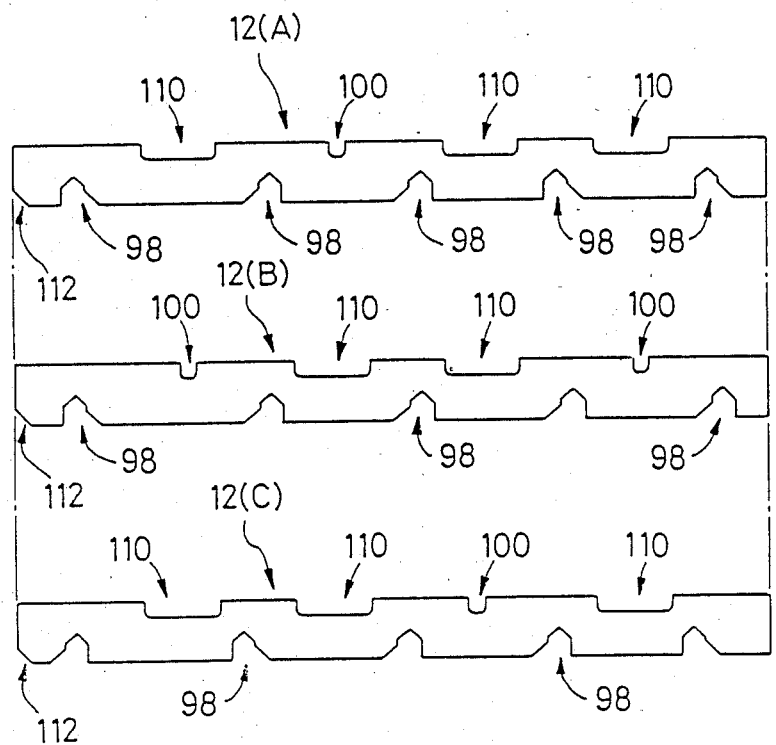
FIG. 11 is a schematic plan view of plate cams used in the control device of FIG. 1.

The three plate cams 12(A), 12(B) and 12(C) are shaped as illustrated in FIG. 11. Each cam plate 12 has five first cutouts 98 which are formed from one of transverse opposite ends (as viewed in the direction of width of the cam plates 12) toward the other transverse end. These first cutouts 98 are positioned so that they are engageable with the actuator portions (rear end portions) 36 of the corresponding five push levers 30 when the levers 30 are operated. The plate cams 12 have four second cutouts 100 which are formed from the above-indicated other transverse end (upper end in FIG. 11) toward the above-indicated one end (lower end). Described more particularly, the second cutout 100 formed in the plate cam 12(A) engages the operating portion 80 of the changeover switch 14(B), and the two second cutouts 100 formed in the plate cam 12(B) engage the operating portions 80 of the changeover switches 14(A) and 14(D). The second cutout 100 formed in the plate cam 12(C) engages the operating portion 80 of the changeover switch 14(C).

Figure 12:
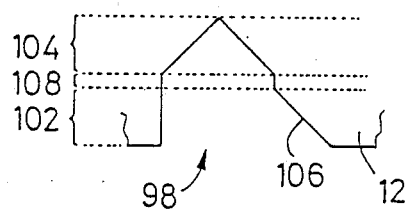
FIG. 12 is an enlarged view showing the configuration of a first cutout formed in the plate cams.

As depicted in FIG. 12, each of the five first cutouts 98 consists of: a wide mouth portion 102 which is open in the edge of the plate cam 12 and which receives the actuator portion 36 of the corresonding push lever 30 (FIG. 5) while the push lever 30 is placed in the non-operated position of FIG. 3; a positioning bottom portion 104 which has a shape identical with the triangular cross sectional shape of the actuator portion 36 of the push lever 30, and which engages the actuator portion 36 (FIG. 5) when the push lever 30 is pushed to its operated position; and a straight portion 108 between the mouth portion 102 and the positioning bottom portion 104. The bottom portion 104 is located a given distance off the center of the mouth portion 102 to the left or right in the longitudinal direction of the plate cam 12. The mouth portion 102 has an inclined surface 106 which terminates in the straight portion 108. The inclined surface 106 is provided on one of opposite sides of the above-indicated center of the mouth portion 102, that is, on the side remote from the positioning bottom portion 104 in the longitudinal direction of the plate cam 12. When the corresponding push lever 30 is pushed while the inclined surface 106 is located so as to cover the tip of the actuator portion 36, the actuator portion 36 slidably contacts the inclined surface 106 while moving the corresponding plate cam 12, and eventually comes into engagement with the positioning bottom portion 104. Thus, the inclined surface 106 co-operates with the bottom portion 104 and the actuator portion 36 to position the plate cam 12 when the push lever 30 is pushed. The width of the mouth portion 102 as measured in the direction of length of the plate cam 12 is so determined as to allow the plate cam 12 to be moved relative to the actuator portion 36 of the push lever 30 in the non-operated position, when the same plate cam 12 is moved as a result of movement of the other push lever 30.

The positioning bottom portion 104 of the triangular shape identical to the shape of the actuator portion 36 serves to move the plate cam 12 exactly to the predetermined longitudinal position when the push lever 30 is operated. The relatively short straight portion 108 serves to give a desirable operating feel to the operator of the push lever 30 when the actuator portion 36 slides on the inclined surface 106 into the bottom portion 104. However, the straight portion 108 may be eliminated.

As described above, each of the five cutouts 98 formed in each plate cam 12 has the wide mouth portion 102 and the positioning bottom portion 104. However, the positions of the five cutouts 98 in one plate cam 12 in the longitudinal direction are different from or the same as the positions of the corresponding five cutouts 98 in another plate cam 12. Further, the inclined surface 106 of the mouth portion 102 is formed in one or the other side of the center of the mouth portion 102, depending upon the position of the cutout 98 in the longitudinal direction of the plate cam 12. Namely, the positions of the five first cutouts 98 in the three plate cams 12(A), 12(B) and 12(C), and the positions of the inclined surfaces 106 of the mouth portions 102, are determined so that the three plate cams 12(A), 12(B) and 12(C) are longitudinally moved to the predetermined positions corresponding to the positions of the five push-lever units 10, when the push levers 30 are pushed forward to their operated positions at which their actuator portions 36 snugly fit the positioning bottom portions 104 of the corresponding first cutouts 98 formed in the individual plate cams 12.

The four second cutouts 100 engagig the operating portions 80 of the four changeover switches 14 are shaped so as to inhibit relative longitudinal movements between the actuator members 76 having the operating portion 80, and the plate cams 12 having the second cutouts 100. The positions of these second cutouts 100 in the longitudinal direction of the plate cams 12 are so determined that the valve members 70 of the changeover switches 14 are placed in the predetermined one of the first and second positions when the corresponding push levers 30 are operated, as described later in more detail.

As shown in FIG. 11, each of the three plate cams 12 has two or three third cutouts 110 which are formed in the same transverse end of the plate cam in which the second cutouts 100 are formed. These third cutouts 110 have a larger width than the second cutouts 100. The third cutouts 110 are provided so that the operating portion 80 of each changeover switch 14 engages the second cutout 100 formed in one of the three plate cams 12, and is accommodated in the third cutouts 110 formed in the other two plate cams 12, as indicated in FIGS. 5 and 11. The third cutouts 110 allow each plate cam 12 to be longitudinally moved to operate one of the four changeover switches 14 upon depression of the corresponding push lever 30, without operating the other changeover switches 14.

Each plate cam 12 has a chamfered corner 112 at its left-hand side longitudinal end as shown in FIG. 11. The chamfered corners 112 are provided to facilitate recognition of the correct orientation of the three plate cams 12 when they are assembled into the cam assembly.

The plate cams 12(A), 12(B) and 12(C) are superposed on each other, as shown in FIGS. 5 and 6, and the thus assembled plate cams 12 are positioned in the control device, so as to extend through the slots 38 formed in the housings 20 of the push-lever units 10. In this condition, the first cutouts 98 receive in their mouth portions 102 the actuator portions 36 of the corresponding push levers 30, while the second and third cutouts 100, 110 engage or accommodate the operating portions 80 of the corresponding changeover switches 14, as previously described. When the push levers 30 are selectively operated, the plate cams 12 are longitudinally moved to place the changaeover switches 14 in the predetermined positions corresponding to the operated push levers 30.

Figure 13:
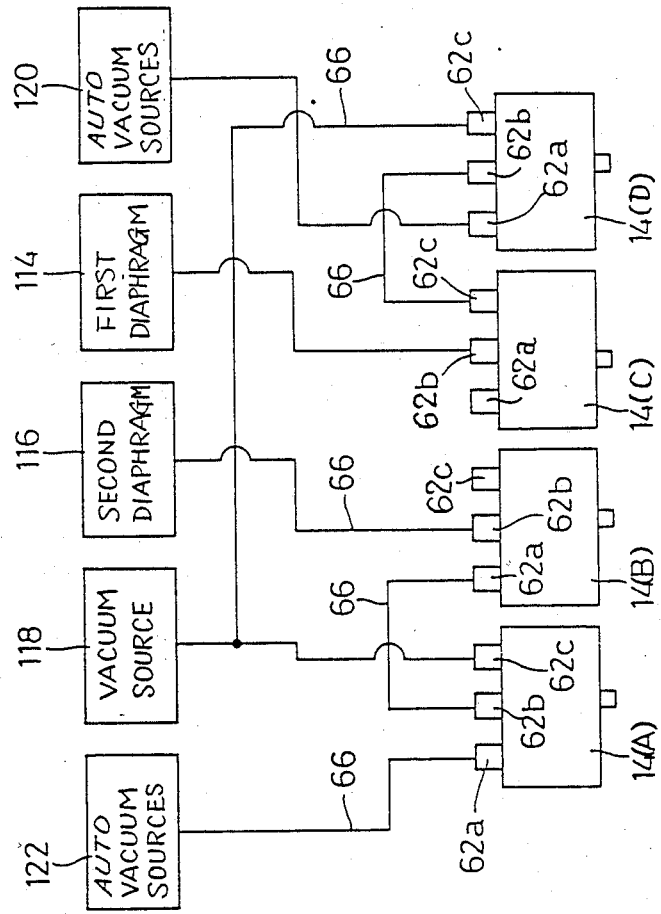
FIG. 13 is a diagram of a pneumatic circuit to which the changeover switches of the control device are connected.

Stated in greater detail referring to FIG. 1, FIG. 13 and Table 1, the operations of the push levers 30 of the five push-lever units 10(A)-10(E) (from left to right in FIG. 1) will cause the changeover switches 14(A)-14(D) (from left to right in FIGS. 1 and 13) to connect the selected two ports of their three ports 62a, 62c and 62c (from left to right in FIGS. 1 and 13), as indicated in Table 1.

TABLE 1

|  |  | PUSH-LEVER UNITS 10 | | | | |
| --- | --- | --- | --- | --- | --- | --- |
|  |  | A | B | C | D | E |
| CHANGEOVER | A | a-b | b-c | b-c | b-c | b-c |
| SWITCHES | B | a-b | b-c | b-c | a-b | a-b |
| 14 | C | b-c | a-b | b-c | b-c | a-b |
|  | D | a-b | b-c | b-c | b-c | b-c | a: Port 62a
b: Port 62b
c: Port 62c

There is shown in FIG. 13 a pneumatic circuit of the air-conditioning system which is controlled by the four changeover switches 14 of the present pneumatic control device. The pneumatic circuit includes a vacuum-operated mechanism in the form of first and second diaphragm 114, 116 which are connected through the hoses 66 to the ports 62b of the changeover switches 14(C) and 14(B), respectively. The pneumatic circuit further includes a vacuum source 118 connected to the ports 62c of the changeover switches 14(A) and 14(D), and two AUTO vacuum sources 120, 122 connected to the ports 62a of the changeover switches 14(D) and 14(A), respectively. The AUTO vacuum sources 120, 122 are controlled by ON-OFF switches operable in response to an AUTO signal. The port 62b of the changeover switch 14(A) is connected to the port 62a of the changeover switch 14(B), while the port 62c of the changeover switch 14(C) is connected to the port 62b of the changeover switch 14(D). The port 62c of the changeover switch 14(B) and the port 62a of the changeover switch 14(C) are open to the atmosphere. With the ports 62 of the changeover switches 14 connected to the elements 114, 116, 118, 120, 122, to the atmosphere or to the other ports 62, as indicated in Table 1, the air-conditioning system is selectively placed in one of the five operation modes, "AUTO", "VENT", "BI-LEVEL", "HEAT" and "DEF".

When the push lever 30 of the push-lever unit 10A is operated, the changeover switches 14(A), 14(B) and 14(D) are placed in their first position while the changeover switch 14(C) is placed in its second position, as indicated in Table 1. As a result, the AUTO vacuum sources 120 and 122 are connected to the first and second diaphragms 114, 116, respectively, whereby the air-conditioning system is placed in the AUTO mode in which the diaphragms 114, 116 are operated by vacuum pressures generated by the AUTO vacuum sources 120, 122.

When the push lever 30 of the push-lever unit 10B is operated, the changeover switches 14(C) is placed in the first position while the other changeover switches 14(A), 14(B) and 14(D) are placed in the second position. As a result, the first and second diaphragms 114, 116 are both open to the atmosphere, whereby the system is placed in the VEND mode.

When the push lever 30 of the push-lever unit 10C is operated, the first diaphragm 114 is connected to the vacuum source 118, while the second diaphragm 116 is open to the atmosphere, whereby the system is placed in the BI-LEVEL mode.

Similarly, the air-conditioning system is placed in the HEAT and DEF modes by operating the push levers 30 of the push-lever units 10(D) and 10(E), respectively.

As described above, the pneumatic circuit connected to the present control device is selectively placed in one of the five operating states corresponding to the five operation modes of the air-conditioning system, by operating the appropriate push levers 30 whose operating front ends are located on a straight line parallel to and in front of the front surface of the control device. Unlike the conventional pneumatic control device, the present embodiment of the invention does not use springs for biasing the actuator members 76 of the changeover switches 14 in their operating direction (longitudinal direction), or springs for biasing the plate cams 12 in the longitudinal direction. Accordingly, the operating forces necessary to operate the push levers 30 for operating the changeover switches 14 is considerably reduced.

A further advantage of the present embodiment lies in the use of the compact cam assembly consisting of three plate cams 12 superposed on each other, which cam assembly functions to transmit the operating forces from the push levers 30 to the changeover switches 14. That is, the use of the cam assembly of the type illustrated contributes to minimization of the overall size of the pneumatic control device.

Further, the provisions of the three ports 62a, 62b, 62c in each changeover switch 14 permits easy designing of the pneumatic circuit and gives the circuit increased versatility. Yet, the changeover switch is constructed more compact than the conventional changeover switch having three ports, since the outer two ports 62a and 62b are connected to the corresponding through-holes 60 through the communication grooves 68, as previously described. This also contributes to the minimization of the control device.

While the plate cams 12(A), 12(B) and 12(C) are superposed on each other as indicated in FIG. 6, the order of superposition or the positions of the three plate cams 12 may be selected at random, without affecting the function of the cam assembly. Further, the changeover switches 14 may be used in the inverted position (with respect to the position shown in FIG. 2), that is, have no assembling directionality in terms of their upper and lower sides. Thus, the control device may be easily assembled.

As shown in FIG. 11, the two second cutouts 100 are formed in the second plate cam 12(B). This makes it possible to operate the two changeover switches 14(A) and 14(D) by the single plate cam 12(B), permitting the four changeover switches 14 to be operated by means of a total of three plate cams 12.

While the present invention has been described in its preferred embodiment with a certain degree of particularity, for illustrative purpose only, it is to be understood that the invention is by no means confined to the preceise details of the illustrated embodiment.

Although the changeover switches 14 are positioned behind the assembly of the plate cams 12 and parallel to the cams 12, it is possible to dispose the changeover switches 14 above the cam assembly 12, with necessary modifications for operative connection therebetween in the vertical direction. In this case, the space for the control device is reduced.

In the illustrated embodiment, the ports 62 and the operating portion 80 of the actuator member 76 are formed so as to extend in the opposite directions, it is possible to modify the changeover switch 14 so that the ports 62 extend in other directions, for example, perpendicular to the direction of extension of the operating portion 80. Further, the changeover switch 14 may have only two ports for connection to air hoses, and one hole or aperture which is connectable to one of the two ports and to the atmosphere.

Further, the grooves 68 which are formed in the inner surface of the port member 64 may be formed in the outer surface of the rear wall 58 contacting the inner surface of the port member 64.

While the ports 62 are formed in the port member 64 which is prepared separately from the housing 52, it is possible to form the ports 62 in the rear wall 58 of the housing 52, and form the through-holes 60 in a separately formed wall member which is secured to the inner surface of the rear wall 58. In the illustrated embodiment, the port member 64 (outer member) cooperates with a wall member (inner member) in the form of the rear wall 58 to form a double-walled structure which has the through-holes 60 and the ports 62. In the modified arrangement indicted above, the separately formed wall member (inner member) and the rear wall 58 (outer member) having the ports cooperate to form a similar double-walled structure. In either case, two communication passages connecting the outer two through-holes 60 to the corresponding outer ports 62a, 62c are defined by the grooves 68 formed in one of the inner and outer members of the double-walled structure, and by the surface covering the grooves 68.

Figure 14:
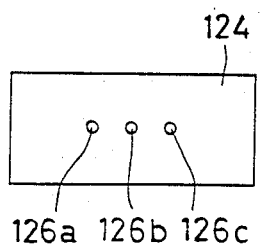
FIG. 14 is a plan view of a sealing member used in another embodiment of the invention.

In the illustrated embodiment, the port member 62 is secured by ultrasonic welding to the outer surface of the rear wall 58 of the housing 52 so as to maintain fluid-tightness of the through-holes 60, passages 68 and ports 62. However, a sealing member such as a sealing plate 124 shown in FIG. 14 may be interposed between the port member 64 and the rear wall 58, so as to maintain fluid-tightness between these three members. In this case, the through-holes 60 are connected to the corresponding ports 62 through holes 126a, 126b and 126c formed in the sealing plate 124. The outer surface of the sealing plate 124 may be provided with grooves which cooperate with the passages 68 to form air passages leading to the ports 62. In the case that a sealing member such as the sealing plate 124 is provided, the sealing member may be fixed to the housing 52 through engagement of tabs formed on one of the sealing member and the rear wall 58, with respective holes or recesses formed in the other.

Although the open ends of the ports 62 are arranged in a straight line in the longitudinal direction of the housing 52, it is possible that their open ends are positioned on a line at a suitable angle to the longitudinal direction of the housing 52, or positioned in a zig zag manner.

Although the illustrated embodiment of the pneumatic control device is applied to the air-conditioning system operable in the five modes (AUTO, VENT, BI-LEVEL, HEAT and DEF), the principle of the present invention is equally applicable to any other pneumatic system operable selectively in a plurality of modes.

It will be obvious that the present invention may be embodied with various other changes, modifications and improvements which may occur to those skilled in the art, without departing from the spirit and scope of the invention defined in the appended claims.

What is claimed is:

1. A changeover switch for controlling a pneumatic system, comprising:
   a housing including a front wall having an elongate slot extending in one direction, and a rear wall parallel to said front wall;
   a wall member cooperating with said rear wall of said housing to define a double-walled structure, one of said wall member and said rear wall of said housing forming an inner member of said double-walled structure having three mutually independent through-holes which are formed through said inner member, said three through-holes being spaced apart from each other in said one direction, the other of said wall member and said rear wall forming an outer member of said double-walled structure having three ports which are connected to said three through-holes, respectively;
   a valve member disposed in said housing and movable in said one direction between a first and a second position thereof such that an outer surface of said valve member is fluid-tightly slidable on an inner surface of said inner member of said double-walled structure, said valve member having two mutually independent recesses in said outer surface thereof, one of said two recesses communicating with two adjacent through-holes of said three through-holes to thereby connect said two adjacent through-holes, while the other of said two recesses communicating with the remaining one of said three through-holes to thereby inhibit fluid communication of said remaining one through-hole with said two adjacent through-holes, when said valve member is placed in said first position, said other recess communicating with said remaining one through-hole and one of said two adjacent through-holes which is the central through-hole, while said one recess communicating with the other one of said two adjacent through-holes, when said valve member is placed in said second position, whereby the central port is brought into communication with one of the other two ports, selectively;
   an actuator member disposed in said housing movable in said one direction, said actuator member having an operating portion which extends from one of opposite surfaces thereof through said elongate slot formed in said front wall of said housing, such that said elongate slot permits said operating portion to be moved in said one direction when said actuator member is moved between a first and a second positions thereof, said actuator member holding at the other of said opposite surfaces thereof said valve member to move said valve member between said first and second positions thereof when said actuator member is moved between said first and second positions thereof, respectively;
   a sliding member disposed in said housing and movable in said one direction, said sliding member being immovable relative to said valve member and said actuator member and having a slot formed therethrough through which said operating portion of said actuator member extends; and
   biasing means including a compression coil spring, said compression coil spring being disposed between said sliding member and said actuator member and biasing said valve member by a predetermined force via said actuator member to hold said valve member in pressed fluid-tight sliding contact with the inner surface of said inner member of said double-walled structure, said compression coil spring also biasing said sliding member by said predetermined force to hold said sliding member in pressed sliding contact with an inner surface of said front wall.

2. A changeover switch according to claim 1, wherein said compression coil spring is wound around a part of said operation portion of said actuator member.

3. A changeover switch according to claim 1, wherein said central through-hole of said three through-holes is directly connected to the corresponding central port of said three ports, while the remaining two through-holes of said three through-holes are connected to the corresponding remaining ports, respectively, through respective grooves formed in said inner surface of said outer member of said double-walled structure.

4. A changeover switch according to claim 3, wherein the pitch of said three through-holes open to an inside space of said housing is smaller than that of said three ports.

5. A changeover switch according to claim 1, wherein said actuator member has a pair of projections which extend toward said sliding member, while said sliding member has a pair of opposed bent portions which extend from opposite longitudinal ends thereof toward said actuator member and which engage the corresponding projections of said actuator member, respectively, whereby said actuator member and said sliding member are immovable relative to each other.

* * * * *